United States Patent
Badger, II et al.

(10) Patent No.: US 10,766,446 B2
(45) Date of Patent: Sep. 8, 2020

(54) EXTERNAL VEHICLE COMPONENT CONTROL

(71) Applicant: Ford Global Technologies, LLC, Dearborn, MI (US)

(72) Inventors: Charles Everett Badger, II, Westland, MI (US); Brandon Beauvais, Dearborn, MI (US); Matthew Fleming, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/617,023

(22) Filed: Jun. 8, 2017

(65) Prior Publication Data
US 2018/0354441 A1    Dec. 13, 2018

(51) Int. Cl.
| | |
|---|---|
| *B60W 50/10* | (2012.01) |
| *B60R 21/0136* | (2006.01) |
| *G07C 5/08* | (2006.01) |
| *G01C 21/36* | (2006.01) |
| *G01C 21/34* | (2006.01) |

(52) U.S. Cl.
CPC .......... *B60R 21/0136* (2013.01); *G01C 21/36* (2013.01); *G07C 5/0841* (2013.01); *G01C 21/3407* (2013.01); *G01C 21/3629* (2013.01)

(58) Field of Classification Search
CPC ............... G01C 21/36; G01C 21/3407; G01C 21/3629; B60R 21/0136; B60R 16/02; G07C 5/0841; G06F 3/0481; B62D 15/0285; B60W 50/10; B60W 30/06
See application file for complete search history.

(56) References Cited

U.S. PATENT DOCUMENTS

| | | |
|---|---|---|
| 4,465,155 A | 8/1984 | Collins |
| 5,386,364 A | 1/1995 | Tyler |
| 6,611,738 B2 | 8/2003 | Ruffner |
| 9,110,469 B2 | 8/2015 | Yamamoto et al. |
| 9,440,660 B2 | 9/2016 | Sherony et al. |
| 2006/0045679 A1 | 3/2006 | Ostendorff |
| 2006/0053534 A1 | 3/2006 | Mullen |
| 2008/0140253 A1 | 6/2008 | Brown |
| 2010/0049388 A1 | 2/2010 | Moriguchi et al. |
| 2011/0004342 A1 | 1/2011 | Knopow et al. |

(Continued)

FOREIGN PATENT DOCUMENTS

| | | | |
|---|---|---|---|
| DE | 102013104859 A1 | 11/2014 | |
| DE | 102015217485 A1 * | 3/2017 | ......... B62D 15/0285 |
| KR | 20140058720 A * | 5/2014 | |

OTHER PUBLICATIONS

Search report for GB application No. 1809294.0, dated Dec. 18, 2018 (Year: 2018).*

(Continued)

*Primary Examiner* — Genna M Mott
(74) *Attorney, Agent, or Firm* — Frank A. MacKenzie; Bejin Bieneman PLC (57) ABSTRACT

A system includes a computer programmed to receive impact sensor data specifying a force of an impact to a vehicle body panel. The computer is programmed to, upon determining that the force is below a collision force threshold, identify the impact as user input. The computer is programmed to actuate a vehicle component according to the user input.

12 Claims, 3 Drawing Sheets

(56) References Cited

U.S. PATENT DOCUMENTS

| | | |
|---|---|---|
| 2013/0231821 A1 | 9/2013 | Rothoff |
| 2013/0231824 A1 | 9/2013 | Wilson et al. |
| 2015/0073645 A1 | 3/2015 | Davidsson et al. |
| 2015/0088360 A1 | 3/2015 | Bonnet et al. |
| 2015/0205300 A1 | 7/2015 | Caver |
| 2015/0251693 A1 | 9/2015 | Lavoie et al. |
| 2015/0337587 A1 | 11/2015 | Lu et al. |
| 2016/0116293 A1 | 4/2016 | Grover et al. |
| 2016/0144857 A1* | 5/2016 | Ohshima ............... G08G 1/056 701/23 |
| 2016/0209842 A1 | 7/2016 | Thakur et al. |
| 2016/0249181 A1* | 8/2016 | Taniguchi ............... H04W 4/21 |
| 2017/0061965 A1 | 3/2017 | Penilla et al. |
| 2018/0130351 A1* | 5/2018 | Ha ........................... B60R 1/00 |

OTHER PUBLICATIONS

Tsuda et al., "Mobile Robot with Following Function and Autonomous Return Function," ICROS-SICE International Joint Conference 2009; Aug. 18-21, 2009; 6 pages.

Jenson, "The Growing Potential for Fully Autonomous Mines," Off-Highway, Sep. 9, 2016; 4 pages.

\* cited by examiner

EXTERNAL VEHICLE COMPONENT CONTROL

BACKGROUND

Vehicle components are typically controlled based on a user input to vehicle controls within the vehicle, e.g., a user interface, a steering wheel, etc. Vehicle components can also be controlled based on a user input to a remote device, e.g., a key fob, mobile computing device, etc., but such remote devices have limited capabilities, can be awkward or difficult to carry and access, and/or may not be available.

DETAILED DESCRIPTION

Introduction

Disclosed herein is a method including receiving impact sensor data specifying a force of an impact to a vehicle body panel. The method includes, upon determining that the force is below a collision force threshold, identifying the impact as a user input. The method includes actuating a vehicle component according to the user input.

The method may further include navigating the vehicle to a location based on the user input.

The method may further include receiving a location of the vehicle upon detecting the impact, and to navigate the vehicle to the received location upon detecting a second impact to the body panel.

The method may further include identifying the location based on an audio input.

The method may further include receiving the location from a second computer.

The method may further include identifying the location based on a pattern of the impact and one or more second impacts to the body panel.

The method may further include, after detecting the impact, determining that a user device in not within a threshold distance of the vehicle; and then selecting the location from a set of one or more predetermined locations.

The method may further include identifying the vehicle component based on a pattern of the impact and one or more second impacts to the body panel.

The method may further include actuating the vehicle component based on a determination that a force of the impact to the body panel is above an incidental force threshold.

The method may further include identifying the vehicle component based on an audio input.

Also disclosed herein is a computer programmed to perform the method.

Also disclosed herein is a computer readable medium storing program instructions executable by a computer processor to perform the method.

Also disclosed herein is system, comprising a vehicle comprising a computer programmed to perform the method.

Also disclosed herein is a system, including a computer programmed to receive impact sensor data specifying a force of an impact to a vehicle body panel. The computer is programmed to, upon determining that the force is below a collision force threshold, identify the impact as a user input. The computer is programmed to actuate a vehicle component according to the user input.

The computer may be further programmed to navigate the vehicle to a location based on the user input.

The computer may be further programmed to receive a location of the vehicle upon detecting the impact, and to navigate the vehicle to the received location upon detecting a second impact to the body panel.

The computer may be further programmed to identify the location based on an audio input.

The computer may be further programmed to receive the location from a second computer.

The computer may be further programmed to identify the location based on a pattern of the impact and one or more second impacts to the body panel.

The computer may be further programmed to, after detecting the impact, determine that a user device in not within a threshold distance of the vehicle; and then select the location from a set of one or more predetermined locations.

The computer may be further programmed to identify the vehicle component based on a pattern of the impact and one or more second impacts to the body panel.

The computer may be further programmed actuate the vehicle component based on a determination that a force of the impact to the body panel is above an incidental force threshold.

The computer may be further programmed to identify the vehicle component based on an audio input.

Figure 1:
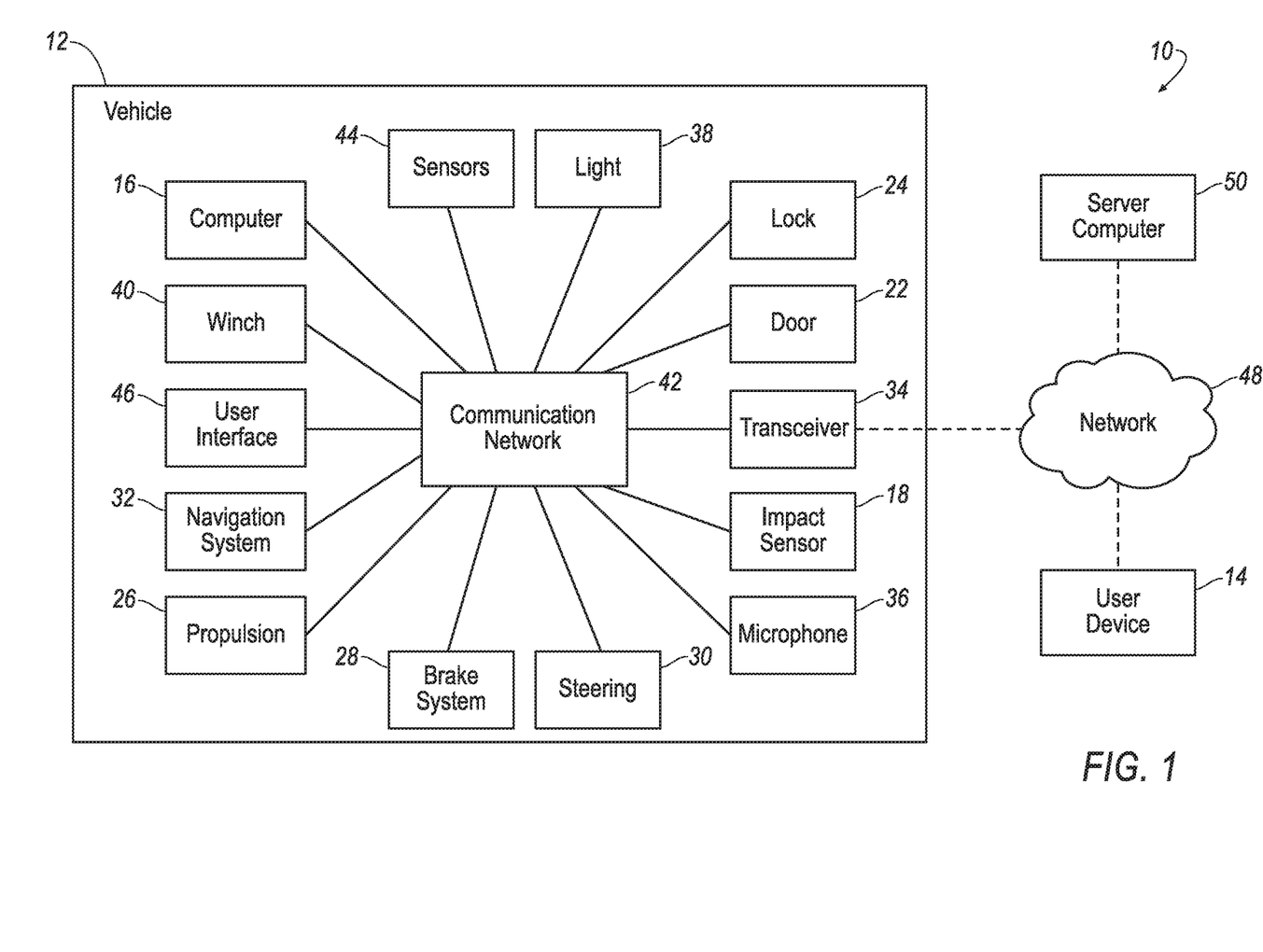
FIG. 1 is a block diagram of components of an example external vehicle component control system.
Figure 2:
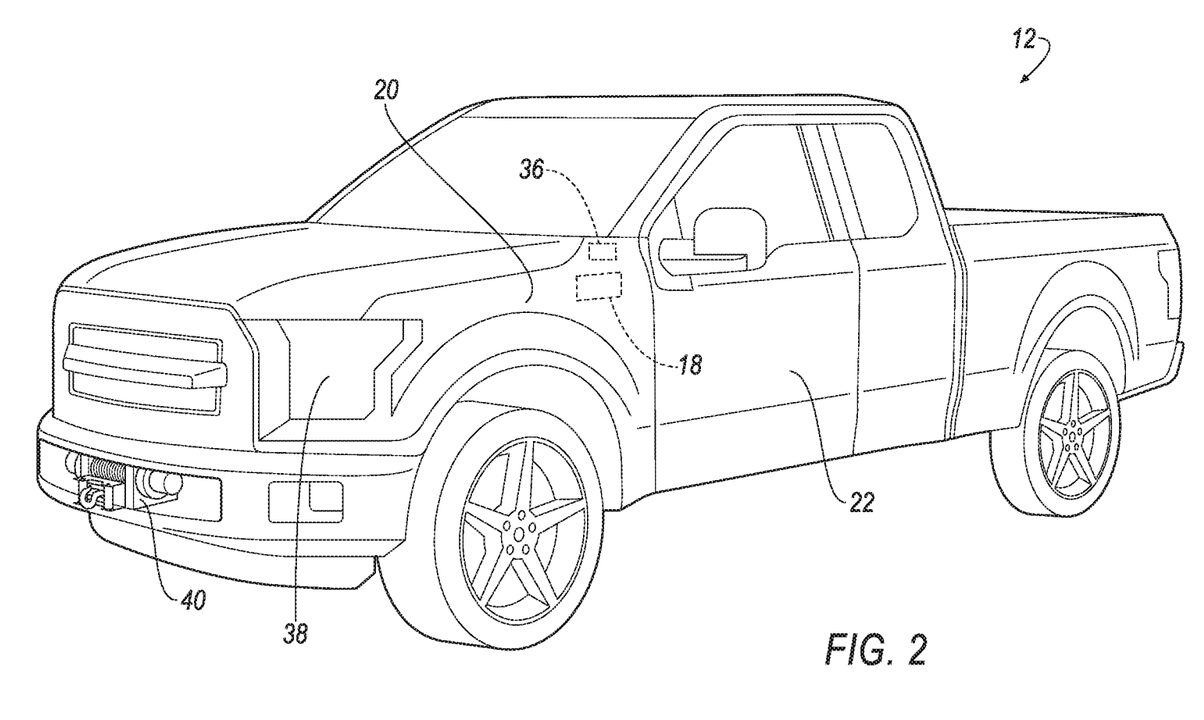
FIG. 2 is a perspective view of an example vehicle for use with the control system of FIG. 1.

With reference to FIGS. 1 and 2, wherein like numerals indicate like parts throughout the several views, a system 10 provides for controlling components of a vehicle 12 from outside the vehicle without a remote input device such as a key fob or mobile computing device. The system 10 includes a computer 16 programmed to receive impact sensor 18 data specifying a force of an impact to a vehicle 12 body panel 20. Upon determining that the force is below a collision force threshold, the computer 16 is programmed to identify the impact as user input and to actuate one or more vehicle components according to the user input.

As used herein, the collision force threshold is a force data value, e.g., in newton meters, to which received impact sensor 18 data can be compared, the force threshold specifying that a detected impact force exceeding the collision force threshold is the result of a collision of the vehicle 12 with another object, such as another vehicle 12. For example, force of an impact above the collision force threshold may be of sufficient magnitude that an occupant restraint system of the vehicle 12, such as an airbag, should be actuated.

As used herein, a vehicle component is an electrical or electromechanical component of the vehicle 12 that may be actuated by the computer 16, e.g. to perform an action such as moving one or more vehicle parts, to collect information, etc. Example vehicle components include a door 22, a lock 24, a propulsion 26, a brake system 28, a steering 30, a navigation system 32, a transceiver 34, a microphone 36, a light 38, a winch 40, etc.

A communication network 42 provides communication between the impact sensor 18, the computer 16, sensors 44, a user interface 46, and other vehicle components.

The Wide Area Network

A network 48 (sometimes referred to as a wide area network because it can include communications between devices that are geographically remote from one another, i.e., not in a same building, vehicle, etc.,) represents one or more mechanisms by which remote device, e.g., the vehicle 12, the user device 14, a server computer 50, etc., may communicate with each other. Accordingly, the network 48 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

User Device

A user device 14 may be any one of a variety of computing devices implemented via circuits, chips, antenna, or other electronic components, and is typically a portable or wearable user device, e.g., a smartphone, a tablet, a personal digital assistant, a key fob, etc. The user device 14 may include a user interface that presents information to and receives information from a user of the user device 14. The user interface may include a touch-sensitive display screen, speaker, microphone, etc. The user device 14 may communicate with other vehicles and computing devices, as described below for the vehicle transceiver 34.

The Vehicle

With reference to FIGS. 1 and 2, the vehicle 12 may include any passenger or commercial automobile such as a car, a truck, a sport utility vehicle, a crossover vehicle, a van, a minivan, a taxi, a bus, etc. The vehicle 12 may operate in an autonomous mode, a semi-autonomous mode, and/or a non-autonomous mode. For purposes of this disclosure, an autonomous mode is defined as one in which each of the propulsion 26, the brake system 28, and the steering 30 of the vehicle 12 are controlled by one or more vehicle computers 16; in a semi-autonomous mode computer(s) 16 of the vehicle 12 control(s) one or two of vehicle the propulsion 26, the brake system 28, and the steering 30; each of these are controlled by a human operator in a non-autonomous mode.

The body panel 20 provides an external covering to the vehicle 12. The body panel 20 is a conventional part and protects and may support vehicle components, and provides a pleasing aesthetic to the vehicle 12.

The door 22 covers an opening in the vehicle 12 to provide or prohibit entry and egress to and from a passenger cabin of the vehicle 12. The door 22 moves between an open position and a closed position. Although shown as a conventional side-mounted swinging vehicle 12 door 22, the door 22 may be a sliding door, a rear door, a hatchback, a gullwing door, etc. The door 22 may be implemented with various circuits, chips, wiring, electric motors, hydraulic cylinders, linear actuators, etc., to move the door 22 between the open position and the closed position, e.g., in response to an instruction from the vehicle computer 16.

The door 22 may include a door lock 24. The door lock 24 includes a lock portion and a latch. The lock portion of the door lock 24 prevents movement of the latch. The lock portion thus secures the vehicle door 22 to a body of the vehicle 12, preventing the vehicle door 22 from opening. The door lock 24 may be implemented as described above for the door 22. The door lock 24 can be actuated from an unlocked position to a locked position, and vice versa, e.g., in response to an actuation instruction from the vehicle computer 16. In the unlocked position, the vehicle door 22 can move to an opened position, allowing the user to enter or exit the vehicle 12. When the door is closed and the door lock 24 is the locked position, the vehicle door 22 is prohibited from moving to the opened position. For example, in the locked position, the door lock 24 can include a bolt (not shown) that moves toward the vehicle 12 body to engage the latch, preventing the vehicle door 22 from moving away from the vehicle 12 body.

The light 38 converts electricity into visible light. The light 38 includes a light producing structure, such as a tungsten filament, a light emitting diode (LED) etc. The light producing structure may be enclosed, e.g., within a housing including a reflector and lens. The light 38 may include various circuits, chips, wiring, or other electronic components to provide control of the light 38, e.g., in response to a command received via the communication network 42, and/or a change in power supplied to the light 38, e.g., a change in voltage. The light 38 may be supported by the vehicle 12, e.g., by a bumper of the vehicle 12. Example lights 38 include headlights, floodlights, etc.

The winch 40 includes a spool of cable that may be rotated to extend or retract the cable from the spool. The winch 40 may include an electric motor and gear reduction unit. The winch 40 may be implemented with circuits, chips, wiring, etc., such that the winch 40 actuates to rotate to spool, e.g., in response to an instruction from the computer 16. The winch 40 may be supported by the vehicle 12, e.g., by a frame of the vehicle 12.

The vehicle sensors 44 may detect internal states of the vehicle 12, for example, wheel speed, wheel orientation, tire pressure, and engine and transmission variables. The vehicle sensors 44 may detect the position or orientation of the vehicle 12, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The vehicle sensors 44 may detect the external world, for example, light measurement sensors, photometers, wind speed measurement sensors, radar sensors, scanning laser range finders, light detection and ranging (LIDAR) devices, and image processing sensors such as cameras.

The impact sensor 18, which for ease of description is called out separately from other vehicle sensors 44, is configured to detect an impact to the body panel 20 of the vehicle 12. For example, the impact sensor 18 may be a piezoelectric sensor, a piezo-resistive sensor, a strain gage, etc., supported by the body panel 20 of the vehicle 12.

The microphone 36 detects sound waves, such as an audio input, and provides such sound wave as electrical information, e.g., to the vehicle computer 16. The microphone 36 may be supported by the body panel 20 in a position to detect an input from a user providing an input to the vehicle 12 body that is detected as a user input, e.g., proximate to the impact sensor 18.

The steering 30 is typically a conventional vehicle steering subsystem and controls the turning angle of the wheels. The steering 30 is in communication with and receives input from a steering wheel and/or the vehicle computer 16. The steering 30 may be a rack-and-pinion system with electric power-assisted steering, a steer-by-wire system, as are both known in the art, or any other suitable system.

The propulsion 26 of the vehicle 12 translates stored energy into motion of the vehicle 12. The propulsion 26 is typically a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 26 is in communication with and receives input from the vehicle computer 16 and from a human driver. The human driver may control the propulsion 26 via, e.g., an accelerator pedal and/or a gear-shift lever.

The brake system 28 is typically a conventional vehicle braking subsystem that resists the motion of the vehicle 12 to thereby slow and/or stop the vehicle 12. The brake system 28 may be friction brakes such as disc brakes, drum brakes, band brakes, etc.; regenerative brakes; any other suitable type of brakes; or a combination. The brake system 28 can include an electronic control unit (ECU) or the like that actuates the brake system 28 to resist the motion of the vehicle 12, e.g., in response to a command from the computer 16 and/or from a human driver. The human driver may control the brake system 28 via, e.g., a brake pedal.

The vehicle navigation system 32 determines a location of the vehicle 12 relative to stored map data. Map data may include roads and related data, such as a number of lanes and availability of a shoulder, parking lot, and public rest area locations, etc. The map data may include information for a certain geographic area, such as a worksite, e.g., material pick up and drop off locations, temporary roads, etc. To determine the location of the vehicle 12 according to the map data, the vehicle navigation system 32 may rely on information from a global navigation satellite system, distance data from vehicle sensors 44 attached to a drivetrain of the vehicle 12, a gyroscope, and/or an accelerometer. The map data may be stored locally, such as in the vehicle computer 16 memory (discussed below), in the vehicle navigation system 32, etc. and/or remotely, such as in the server computer 50. Exemplary vehicle navigation systems 32 include known GPS (global positioning system) navigation devices, personal navigation devices, and automotive navigation systems.

The transceiver 34 transmits and receives information wirelessly from other transceivers, enabling signals, data and other information to be exchanged with other computer and network systems. The transceiver 34 may communicate directly, i.e., with a communication that is transmitted or received without an intervening device, e.g., a repeater other network component. The transceiver 34 may alternatively or additionally communicate indirectly, i.e., with a communication that is transmitted or received via an intervening device, e.g., components of the network 48. The transceiver 34 is implemented via antennas, circuits, chips, or other electronic components that can facilitate wireless communication. Example transceivers include Wi-Fi systems, radio transmitters and receivers, telecommunications systems, Bluetooth® systems, cellular systems and mobile satellite transceivers.

The vehicle user interface 46 presents information to and receives information from an occupant of the vehicle 12. The user interface 46 may be located, e.g., on an instrument panel in a passenger cabin of the vehicle, or wherever may be readily seen by the occupant. The user interface 46 may include dials, digital readouts, screens such as a touch-sensitive display screen, speakers, and so on for providing information to the occupant, e.g., human-machine interface (HMI) elements. The user interface 46 may include buttons, knobs, keypads, microphone, and so on for receiving information from the occupant.

The vehicle communication network 42 includes hardware, such as a communication bus, an antenna, circuits, chips, etc., for facilitating wired or wireless communication among the vehicle components in accordance with a number of communication protocols such as the Dedicated Short Range Communication (DSRC) communication protocol, controller area network (CAN), Ethernet, WiFi, Local Interconnect Network (LIN), and/or other wired or wireless mechanisms.

The vehicle computer 16 is a computing device that includes a vehicle processor and a vehicle memory.

Figure 3:
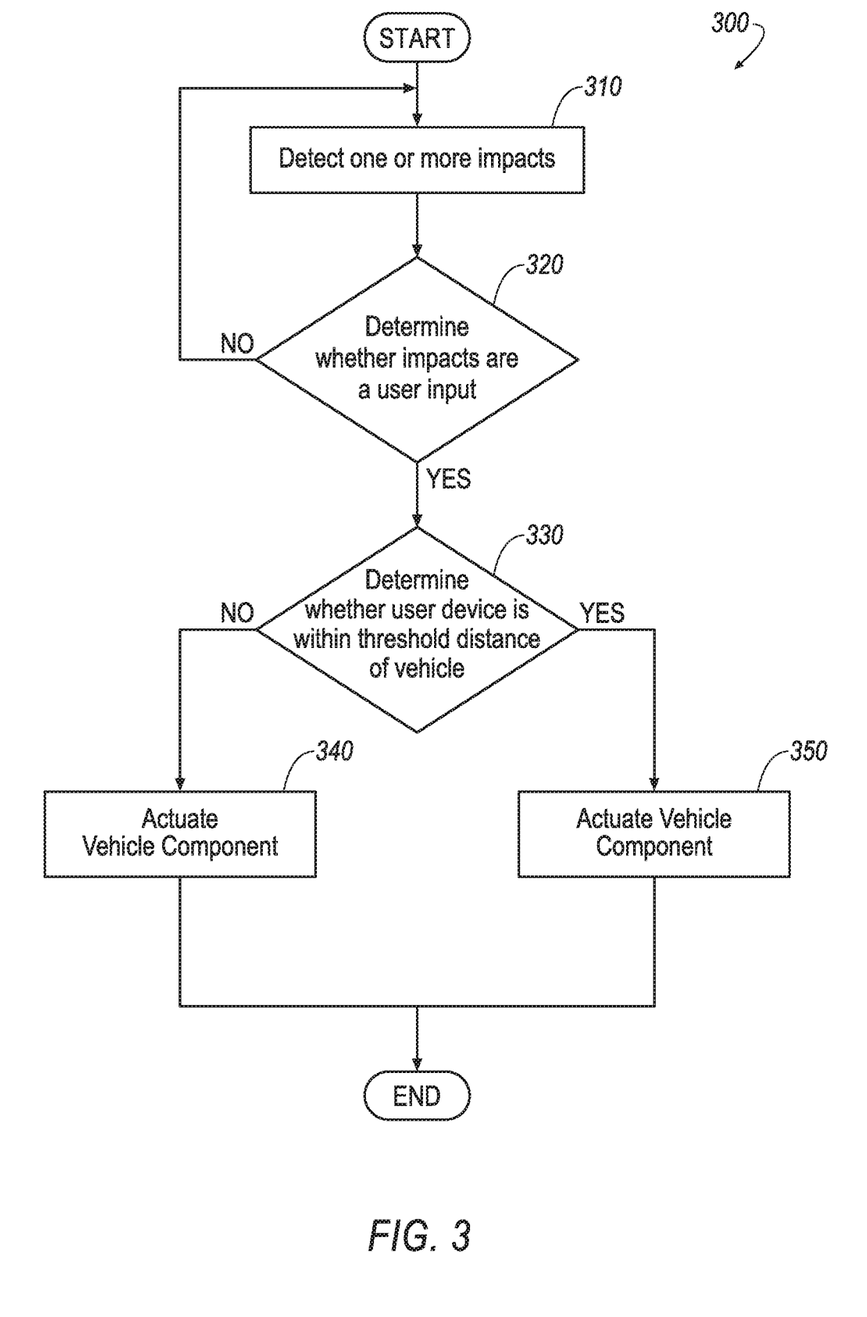
FIG. 3 is a flow chart of an example process of controlling the example vehicle.

The vehicle processor is implemented is implemented via circuits, chips, or other electronic components and may include one or more microcontrollers, one or more field programmable gate arrays (FPGAs), one or more application specific circuits (ASICs), one or more digital signal processors (DSPs), one or more customer integrated circuits, etc. The vehicle processor is programmed to process the data received via the communication network 42, the vehicle memory, etc. Processing the data and communications may include processing to perform the processes described herein, such as those described in process 300.

The vehicle memory is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The vehicle memory may store instructions for performing the processes described herein, such as the process 300, and data collected from the navigation system 32, the sensors 44, the transceiver 34, etc.

The vehicle computer 16 may receive impact sensor 18 data specifying a force of an impact to the vehicle 12 body panel 20, e.g., from the impact sensor 18 via the communication network.

The vehicle computer 16 may determine that the force detected by the impact sensor 18 is below the collision force threshold, e.g., 10 kilonewtons. The vehicle computer 16 may also determine that the force of the impact to the body panel detected by the impact sensor 18 is above an incidental force threshold, e.g., 1 newton. The incidental force threshold is a minimum detected force used to distinguish between impacts to the body panel 22 that are the result of environmental factors, e.g., rain, falling acorns, etc., and intentional user impacts intended to be user inputs to the vehicle 12. The collision force threshold and the incidental force threshold may be stored in the memory of the vehicle 12 computer, e.g., for comparison with the force detected by the impact sensor 18. The collision force threshold and the incidental force threshold may be determined based on empirical testing, and/or based on user input, e.g., to the user interface 46 and/or user device 14. For example, if a user finds the vehicle computer 16 to be less responsive than desired to user impacts to the body panel 20, the user may adjust the incidental force threshold to a lower value with the user interface 46 and/or user device 14.

The vehicle computer 16 may identify the detected impact as user input, e.g. upon determination that the detected impact is between the collision force threshold and the incidental force threshold. Based on such identification, the vehicle computer may actuate a vehicle component and/or navigate the vehicle 12 to a location, according to the user input, e.g., based on impact control data, e.g., stored in a look up table or the like as discussed further below.

The vehicle computer 16 may distinguish between various user inputs based on a pattern of the impact and one or more second impacts to the body panel 22, e.g., two impacts within one second. Based on the pattern, the computer 16 may identify the location to which to navigate the vehicle 12 and/or the one or more vehicle components to actuate.

The vehicle computer 16 may receive a current location of the vehicle 12 upon identifying the detected impact(s) as the user input. For example, the vehicle computer 16 may instruct the navigation system 32 to transmit the current location of the vehicle 12 to the vehicle computer 16. The current location may be stored as a predetermined location for later use. For example, the vehicle computer 16 may navigate the vehicle 12 to return to the received location upon detecting a second impact to the body panel 20.

The vehicle computer 16 may actuate a vehicle component, and or navigate the vehicle to a location, based on, as an alternative or in addition to one or more detected impacts, an audio input, e.g., received by the microphone 36 of the vehicle 12, received by a microphone supported by or in communication with the user device 14, etc. The audio input may provide an indication, e.g., when analyzed using voice recognition techniques, identifying which vehicle component to actuate, including indicating actuating the vehicle 12 to navigate a location, e.g., by actuating the braking system 10, propulsion 26, and steering 30. The vehicle computer 16, and/or user device 14, may analyze the audio input. Additionally or alternatively, the vehicle computer 16, and/or user device 14, may transmit the audio input to a remote computing device for analysis, e.g., to the server computer 50.

The vehicle computer 16 may determine whether the user device 14 is within a threshold distance, e.g., 1 yard, of the vehicle 12. The computer 16 may make such determination based on information from sensors 44, the transceiver 34, etc. For example, the computer 16 may determine the user device 14 is near based on a sensor 44 detecting a transponder in the user device 14, e.g., in a key fob. As another example, the computer 16 may determine the user device 14 is proximate the vehicle 12 based on having a wireless communication connection, e.g., a Bluetooth connection, with the user device 14.

The vehicle may store a list of predetermined, e.g., preauthorized locations and vehicle component actuations. As used herein predetermined or preauthorized locations and vehicle component actuations are, respectively, locations the vehicle may navigate to, and/or vehicle components that may be actuated, when the vehicle computer 16 determines that the user device 14 in not within the threshold distance of the vehicle.

The vehicle computer 16 may store the impact control data, e.g., as a look up table. The impact control data associates various user inputs with various vehicle components to be actuated by the vehicle computer 16. The user input includes one or more impacts to the body panel 20 of the vehicle 12 detected by the computer 16 with the impact sensor 18. The one or more detected impacts may be combined with other user inputs and information received by the computer 16, including an audio input, a proximity of the vehicle 12 to the user device 14, etc.

The impact control data can specify whether each of the various user inputs associated with actuation of various vehicle components is preauthorized. As used herein preauthorized user inputs are those that may be acknowledged without an authorization. The authorization may be provided, for example, based on a proximity of a certain remote device, such as the user device 14, etc., to the vehicle 12. Additionally or alternately, the impact control lookup table may include separate and distinct associations for preauthorized user inputs and vehicle 12 component actuations. For example, a detected impact may be associated with navigating the vehicle 12 to a specific preauthorized location when the certain remote device is not within a threshold distance, e.g., 5 feet, of the vehicle, and the detected impact may be associated with actuating the microphone 36 to receive further user input to determine a location to navigate the vehicle 12 to when the certain remote device is within threshold distance of the vehicle 12. An example impact control lookup table is shown below:

| Impact Detected as User Input | User Device Detected | Output |
|---|---|---|
| Single Impact | Yes | Store current location as preauthorized location and actuate microphone to receive user input indicating desired destination location. Navigate vehicle to destination indicated by audio input detected by microphone. Actuate door to open position upon reaching desired destination location. |
| Double Impact (e.g., two impacts within threshold amount of time, e.g., 1 second) | Yes | Actuate microphone to receive user input, and actuate vehicle component based on audio input detected by microphone. |
| Triple Impact | Yes | Actuate external vehicle light to between ON/OFF states. |
| Single Impact | No | Actuate lock to locked position, and navigate vehicle to stored preauthorized location. |
| Double Impact | No | Actuate microphone to receive user input, and actuate vehicle component based on audio input detected by microphone. |
| Triple Impact | No | Actuate external vehicle light to OFF state. |

The content of impact control table, such as the various associations between different user inputs and vehicle device actuations, as well as what vehicle 12 components, locations, etc., are preauthorized, may be provided by a manufacturer of the vehicle 12, and/or based on user input, e.g., to the user interface 46 and/or user device 14. Accordingly, the vehicle computer 16 may receive the location from a second computer, e.g., from the user device 14 providing various locations to the impact control table.

The vehicle computer 16 may actuate the vehicle 12 components identified based on the user input to the impact sensor 18, the input to the microphone, and the determination of whether the user device 14 is within the threshold distance of the vehicle 12. To actuate the components the vehicle computer 16 may transmit an instruction to component to be actuated via the communication network 42.

The vehicle computer 16 may navigate the vehicle 12 to the location identified based on the user input to the impact sensor 18, the input to the microphone, and the determination of whether the user device 14 is within the threshold distance of the vehicle 12. To navigate the vehicle 12 the vehicle computer 16 may transmit instructions to the steering 30, the brake system 28 and the propulsion 26 via the communication network 42 and based on information from the sensors 44 and navigation system 32.

The Server Computer

The server computer 50 is a computing device that includes hardware, e.g. circuits, chips, antenna, etc., programmed to transmit, receive, and process information, to and from other computing devices such as those in the vehicle 12, the user device 14, etc., e.g., via the network 48. The server computer 50 may be one or more computers, each generally including at least one processor and at least one memory, implemented as described herein, the memory storing instructions executable by the processor, including instructions for carrying out various.

The server computer 50 may be programmed to analyze an audio input, e.g., using voice recognition processing techniques. The server computer 50 may receive the input from the vehicle 12, and/or the user device 14. The server computer 50 may transmit the results of such analysis to the vehicle 12.

Process

FIG. 3 is a process flow diagram illustrating an exemplary process 300 for controlling a vehicle 12 based on impacts that are determined to be a user input to a body panel 20 of a vehicle 12. The process 300 can be implemented according to programming in the computer 16, and begins in a block 310 when the vehicle 12 is turned on, e.g., when power is supplied to the computer 16 of the vehicle 12.

At the block 310 the computer 16 detects one or more impacts to the body panel 20 of the vehicle 12, e.g., based on data received by the computer 16 from an impact sensor 18.

Next, at a block 320 the computer determines whether the one or more detected impacts are a user input, e.g., based on a comparison of a value of the magnitude of the one or more detected impacts with a collision force threshold and an incidental force threshold. Upon determination that the one or more impacts are a user input, e.g., the magnitude of such impact(s) are between the collision force threshold and the incidental force threshold, the process 300 moves to a block 330. Upon determination that the one or more impacts are not a user input, e.g., the magnitude of such impact(s) are not between the collision force threshold and the incidental force threshold, the process 300 returns to the block 310 awaiting detection of another impact.

At the block 330 the computer 16 determines whether the user device 14 is within a threshold distance of the vehicle 12. Upon determination that the user device 14 is not within the threshold distance of the vehicle 12 the process 300 moves to a block 340. Upon determination that the user device 14 is within the threshold distance of the vehicle 12 the process 300 moves to a block 350.

At the block 340 the vehicle computer 16 actuates a predetermined vehicle component, e.g., based on an impact control lookup table. After the block 340 the process 300 may end. Alternatively, after the block 340 the process 300 may return to the block 310 awaiting detection of another impact, with the process 300 ending when the vehicle 12 is powered off or otherwise placed in an inoperable state.

At the block 350 the vehicle computer 16 actuates a vehicle component e.g., based on the impact control lookup table. After the block 350 the process 300 may end. Alternatively, after the block 350 the process 300 may return to the block 310 awaiting detection of another impact, with the process 300 ending when the vehicle 12 is powered off or otherwise placed in an inoperable state.

CONCLUSION

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The adjectives "first" and "second" are used throughout this document as identifiers and are not intended to signify importance or order.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

What is claimed is:

1. A system, comprising a computer programmed to:
   receive impact sensor data specifying a force of a plurality of impacts to a vehicle body panel, the plurality of impacts defining a pattern;
   determine that the force is below a collision force threshold;
   determine a user device status as one of detected or not detected;
   upon determining the user device status as detected and identifying the pattern, navigate the vehicle to a first location; and
   upon determining the user device status as not detected and identifying the pattern, navigate the vehicle to a second location different than the first location.

2. The system of claim 1, the computer further programmed to identify the first location or the second location based on the pattern.

3. The system of claim 2, the computer further programmed to receive a third location of the vehicle upon detecting the plurality of impacts, and to navigate the vehicle to the received third location upon detecting an impact to the body panel. subsequent to navigating the vehicle to the first location or the second location.

4. The system of claim 1, the computer further programmed to identify the first location or the second location based on an audio input.

5. The system of claim 1, the computer further programmed to receive the first location or the second location from a second computer.

6. The system of claim 1, the computer further programmed to navigate the vehicle to the first location or the second location based on a determination that the force of the plurality of impacts to the body panel is above an incidental force threshold.

7. A method comprising:
   receiving impact sensor data specifying a force of a plurality of impacts to a vehicle body panel, the plurality of impacts defining a pattern;
   determining that the force is below a collision force threshold;
   determining a user device status as not detected; and
   upon determining the user device status as not detected and that the force is below the collision force threshold, navigating the vehicle to a location.

8. The method of claim 7, further comprising identifying the location based on the pattern.

9. The method of claim 8, further comprising receiving a second location of the vehicle upon detecting the plurality of impacts, and navigating the vehicle to the received second location upon detecting an impact to the body panel. subsequent to navigating the vehicle to the location.

10. The method of claim 7, further comprising identifying the location based on an audio input.

11. The method of claim 7, the further comprising receiving the location from a second computer.

12. The method of claim 7, further comprising navigating the vehicle to the location based on a determination that the force of the plurality of impacts to the body panel is above an incidental force threshold.

* * * * *

UNITED STATES PATENT AND TRADEMARK OFFICE
CERTIFICATE OF CORRECTION

PATENT NO. : 10,766,446 B2  
APPLICATION NO. : 15/617023  
DATED : September 8, 2020  
INVENTOR(S) : Badger, II et al.

Page 1 of 1

It is certified that error appears in the above-identified patent and that said Letters Patent is hereby corrected as shown below:

In the Claims

Column 11, in Line 25, replace "body panel. subsequent to" with — body panel subsequent to —.

Column 12, in Line 21, replace "impact to the body panel. sub-" with — impact to the body panel sub- —.

Signed and Sealed this  
Seventeenth Day of November, 2020

Andrei Iancu  
*Director of the United States Patent and Trademark Office*